United States Patent [19]

Itikawa

[11] Patent Number: 4,469,438
[45] Date of Patent: Sep. 4, 1984

[54] PRINT MASK SWITCHING DEVICE

[75] Inventor: Koozi Itikawa, Kanagawa, Japan

[73] Assignee: Fuji Photo Film Co., Ltd., Kanagawa, Japan

[21] Appl. No.: 467,054

[22] Filed: Feb. 16, 1983

[30] Foreign Application Priority Data

Feb. 17, 1982 [JP] Japan ............................. 57-21186[U]

[51] Int. Cl.³ ............................................. G03B 27/58
[52] U.S. Cl. ..................................................... 355/74
[58] Field of Search ..................................... 355/74, 72

[56] References Cited

U.S. PATENT DOCUMENTS 3,588,248 6/1971 Freund .................................. 355/74
3,674,365 7/1972 Kohler .................................. 355/74

Primary Examiner—Monroe H. Hayes
Attorney, Agent, or Firm—Sughrue, Mion, Zinn, Macpeak & Seas

[57] ABSTRACT

A print mask switching device in a photographic printing unit in which a plurality of print masks of different size are provided. The print mask necessary for printing is set at the printing position. The plurality of print masks of different size are detachably set on a print mask supporting board which is movable from the printing position. A drive system is provided for opening and closing a print paper guide associated with each of said print masks to close an opening thereof.

8 Claims, 4 Drawing Figures

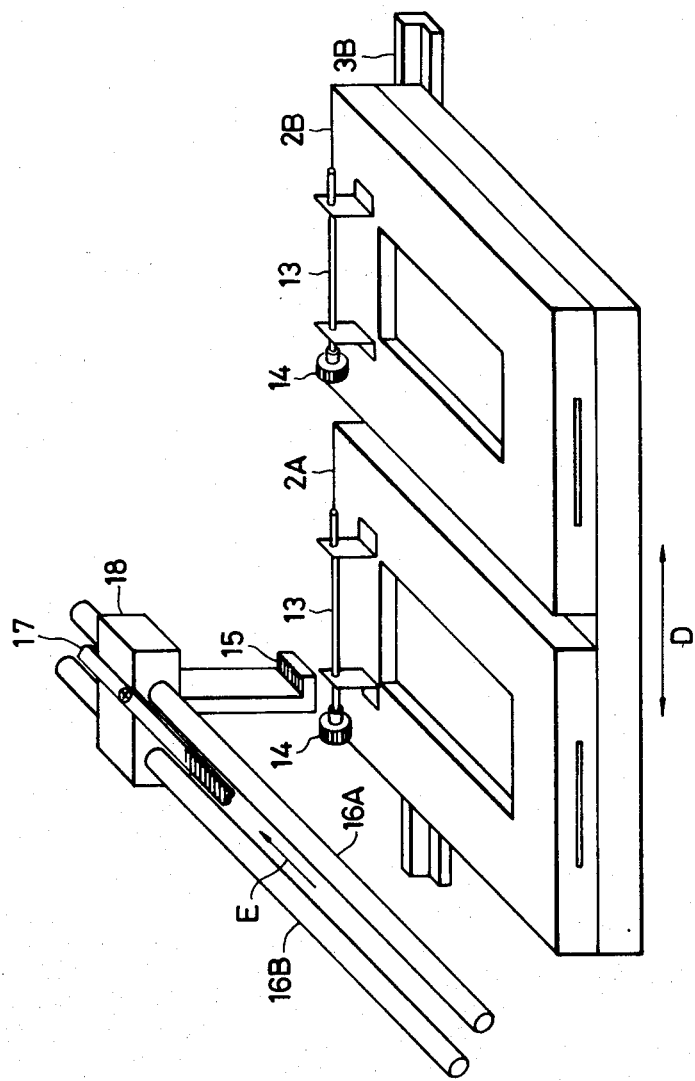

PRINT MASK SWITCHING DEVICE

BACKGROUND OF THE INVENTION

This invention relates to a print mask switching device in a photographic printing unit. More particularly, it relates to a print mask switching device having means for opening and closing a print paper guide which is provided for each print mask to close the opening thereof.

In the operation of a photographic printing unit, it is necessary to change the print mask not only where the size of the print paper is changed, but also where, although the size of the print paper is unchanged the manner of exposure thereto is changed. For example, in the case where printing a picture with no frame is switched over to printing a picture with a frame, or vice versa, the mask must be changed even though paper size remains constant.

In such a case, with a conventional photographic printing unit, the print paper loading section is opened to replace the print mask. For this replacement operation, it is necessary to utilize a room dark environment where the photographic printing unit is installed. Alternatively, a dark bag may be provided at the print paper loading section and is used to replace the mask blindly by feel. Thus, both of these methods are rather troublesome and inefficient.

When print paper is loaded in the print mask which has been set in place, it is necessary to close the opening (or window) of the print mask with a print paper guide so that the print paper may not come out through the opening and may be smoothly fed. In addition, after the print paper has been loaded, the closing member should be removed quickly. Heretofore, this operation is also carried out blindly by feel similar to the replacement of the print mask, and is in fact more troublesome than the print mask replacement.

SUMMARY OF INVENTION

In view of the foregoing deficiencies of the prior art, an object of this invention is to provide a print mask switching device in a photographic printing unit in which the above-described difficulties accompanying the print mask replacement of a conventional photographic printing unit have been eliminated.

It is another object of this invention to define a device for switching the print mask and operating the opening-closing type print paper guide of each print mask without requiring a dark room where the photographic printing unit is installed.

The foregoing and other objects of this invention have been achieved by the provision of a print mask switching device for a photographic printing unit, in which, according to the invention, a plurality of print masks different in size are detachably set on a print mask supporting board which is movable from the printing position. A drive system is provided for opening and closing a print paper guide which is provided for each of the print masks to close the opening thereof.

This invention will be described in greater detail by referring to the drawing and the description of the preferred embodiment that follows.

BRIEF DESCRIPTION OF THE DRAWINGS

FIG. 4 is a perspective view showing guide member opening and closing means.

DESCRIPTION OF THE PREFERRED EMBODIMENT

One preferred embodiment of this invention will be described with reference to the accompanying drawings.

Figure 1:
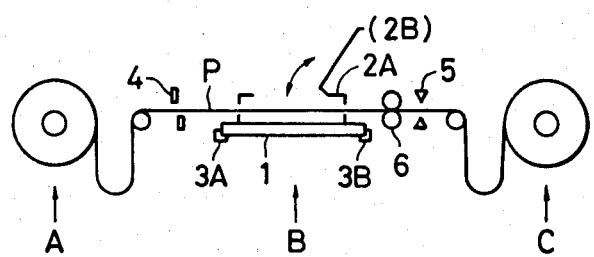
FIG. 1 is a side view of a photographic printing unit provided with a print mask switching device according to one embodiment of this invention.
Figure 2:
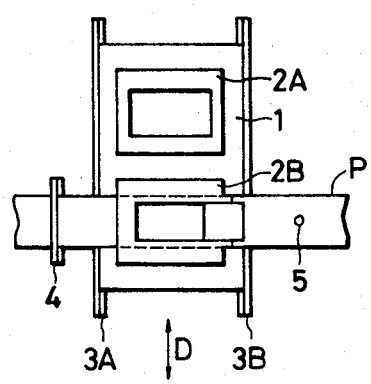
FIG. 2 is a plan view showing a printing section in the unit in FIG. 1.

FIG. 1 is a side view of a photographic printing unit provided with a print mask switching device according to the preferred embodiment of the invention. In FIG. 1, reference letter P designates print paper; A, a print paper feeding section; B, a printing section; and C, a print paper winding section. Further in FIG. 1, reference numeral 1 designates a print mask board adapted to detachably support print masks 2A and 2B, the print mask board being movable along guide rails 3A and 3B in the direction of the arrow D shown in FIG. 2; 4, a cutter which operates in response to a print paper cutting instruction; 5, a print paper detecting sensor; and 6, a pair of print paper conveying rollers. FIG. 2 is a plan view of the printing section B showing the orthogonal orientation of the print masks 2A, 2B relative to the print paper P.

Figure 3:
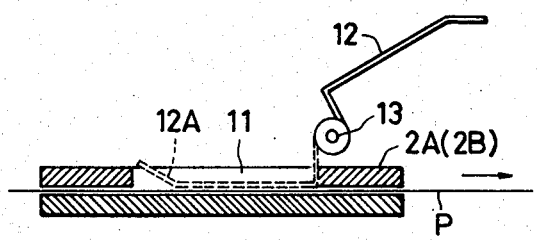
FIG. 3 is a sectional view of a print mask.

The print mask 2A (or 2B), as shown in FIG. 3, has an opening-closing type print paper guide 12 which engages with the opening 11 at the position 12A indicated by the broken line. This tends to guide print paper P when it is loaded therein (hereinafter referred to as "a guide member 12", when applicable). The guide member 12 is fixedly mounted on a shaft 13. The shaft 13 is supported so that the guide member 12 is swung about the shaft 13 between the position 12A indicated by the broken line and the position 12 indicated by the solid line.

FIG. 4 illustrates a mechanism for swinging the guide member 12. For convenience in illustration, only the rotation of the shaft 13 on which the guide member 12 is fixedly mounted is shown for mask 2A. The swinging mechanism of FIG. 4 comprises: a pinion gear 14 on one end of the shaft 13; a rack 15 which is engaged with the pinion gear 14 when the print mask is set at the printing position; and a drive for moving the rack 15 in the print paper feeding direction. The drive comprises a rack supporting block 18 which is attached to and moved by a belt 17 in the direction of the arrow E and in an opposite reciprocating direction on guide rails 16A and 16B.

On the other hand, a center mark (not shown) is provided at the position on the print mask board 1 which corresponds to the center of the print masks 2A and 2B on the print mask board 1 (i.e., the center in the widthwise direction of a print paper). The center mark is utilized in order to stop the print mask board at a predetermined position so that a selected mask is positioned at a print station of said unit.

The operation of the print mask switching device thus constructed will be described with reference to the case where the print mask 2A is used for providing a picture with no frame from a print paper having a certain width (hereinafter referred to as "a first printing operation", when applicable). The print mask 2B is used for providing a picture with a frame from a print paper having the same width (hereinafter referred to as "a second printing operation", when applicable) and the second printing operation using the print mask 2B is switched over to the first printing operation using the print mask 2A.

When the second printing operation using the print mask 2B is accomplished, the operator provides the print paper cutting instruction to operate the cutter 4 (FIG. 1), so that the exposed print paper is wound in the print paper winding section C. When the rear end of the print paper thus cut passes through the print paper detecting sensor 5, the acceptable movement of the print mask board 1 is indicated. In response to this indication, the operator operates the device so that the guide member 12 closes the opening. As a result, the rack supporting block 18 is moved in the direction of the arrow E in FIG. 4, to engage the rack 15 through the pinion gear 14, so that the shaft 13 which has set the guide member 12 open (as indicated by the solid line (12) in FIG. 3) is turned. That is, the guide member 12 is swung to close the opening of the print mask 2B. Thereafter, the rack supporting block 13 itself is retracted to a position where it will not obstruct movement of the print mask.

Then, the operator depresses a print mask board moving button to move the print mask board 1, so that the print mask 2A is set at the printing position instead of the print mask 2B. The movement of the print mask board 1 may be achieved according to a method in which, for instance, the sizes of print masks mounted on the print mask board are indicated, so that the operator determines the direction of movement of the print mask board 1 and the distance of movement of the same 1 from the sizes thus indicated, to provide a moving instruction. The print mask board is stopped according to the aforementioned mark.

When the print mask board 1 is opened and the print mask (being the print mask 2A in this case) is set at the printing section B, the operator operates a print paper loading button or the like to instruct the loading of a print paper. In this case, as in the movement of the print mask 2B, the guide member 12 of the print mask 2A closes the opening associated with that mask. That is, the guide member 12 guides the print paper so that the print paper may not come through the opening of the print mask 2A when loaded.

When the print paper has been loaded, the operator operates the device so that the guide member 12 of the print mask 2A is opened. As a result, the rack supporting block 18 is moved in the opposite direction to the direction of the arrow E in FIG. 4. Consequently, the shaft 13 is turned through the pinion gear 14 to swing the guide member 12 to the position indicated by the solid line in FIG. 3. Thus, preparation for the first printing operation using the print mask 2A has been accomplished.

In the above-described embodiment, the movement of the print mask board 1 and the opening and closing operations of the guide member 12 in association with the movement of the print mask board are carried out by the instructions according to the determinations of the operator. However, in accordance with this invention, these operations may be performed sequentially by mechanical means. In this connection, the device may be modified so that not only the print mask is switched in association with the movement of the print mask board, but also the contents of printing operation are changed—enlarging magnifications are changed according to the combinations of negative film sizes and print sizes or printing conditions are changed according to negative films used.

In the above-described embodiment, the print masks are fixed in size; however, the technical concept of the invention may be applied to print masks which are variable in size. Such masks are disclosed in Japanese Patent Application Laid-Open No. 87032/1981.

As is clear from the above description, in the print mask switching device for the photographing printing unit, according to the invention, a plurality of print masks of different size are detachably set on the print mask supporting board which is movable from the printing position, and drive means for opening and closing a print paper guide mounted on each of the print masks to close the opening is also provided. Accordingly, with the print mask switching device according to the invention, it is not always necessary to use a photographic printing unit in a darkroom arrangement and to perform the replacement with the dark bag. In addition, the device is simple in construction.

I claim:

1. A print mask switching device for a photographing unit having a plurality of masks of different size, comprising:
   a movable print mask supporting board for detachably supporting said plurality of masks;
   a guide member associated with each of said plurality of masks for positioning printing paper; and
   means provided at a printing station of said photographing unit for opening and closing said guide member.

2. The device of claim 1, wherein said supporting board is movable in a direction orthogonal to a printing paper feed direction, said supporting board movable along a guide rail to position a selected mask at said printing station.

3. The device of claim 1, wherein said guide member comprises a plate having an inclined portion disposed to face in the upstream printing paper feed direction, said guide member mounted for rotation on a shaft to selectively be lowered into a paper guiding position on said mask or swung away and out of said printing station.

4. The device of claim 3, wherein said means for opening and closing said guide comprises a pinion gear mounted on said shaft, a rack selectively engaging said pinion and means to reciprocate said rack for opening or closing said guide member.

5. The device of claim 4, wherein said means to reciprocate said rack comprises a drive belt, a guide block supporting said rack and attached to said drive belt and guide rails for said guide block.

6. The device of claim 5, wherein said guide rails extend to remove said rack to a position outside said printing station.

7. The device of claim 1, wherein each of said guide members is mounted for rotation on a shaft, gear means on each shaft and said means for opening and closing said guide member engaging said gear means in said printing station.

8. The device of claim 7, wherein said means for opening and closing said guide member comprises a rack engaging said gear means and means for reciprocating said rack to effectuate opening and closing of said guide member.

* * * * *